May 23, 1972     TOMOMI NAKAMURA     3,664,691

PIPE JOINTS

Filed May 15, 1970     5 Sheets-Sheet 1

INVENTOR

TOMOMI NAKAMURA

BY Polachek & Saulsbury

ATTORNEY

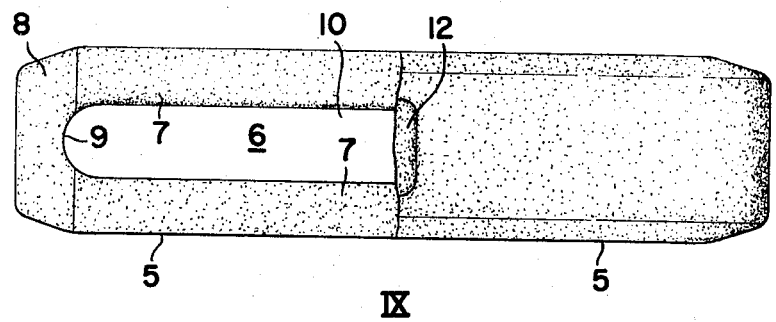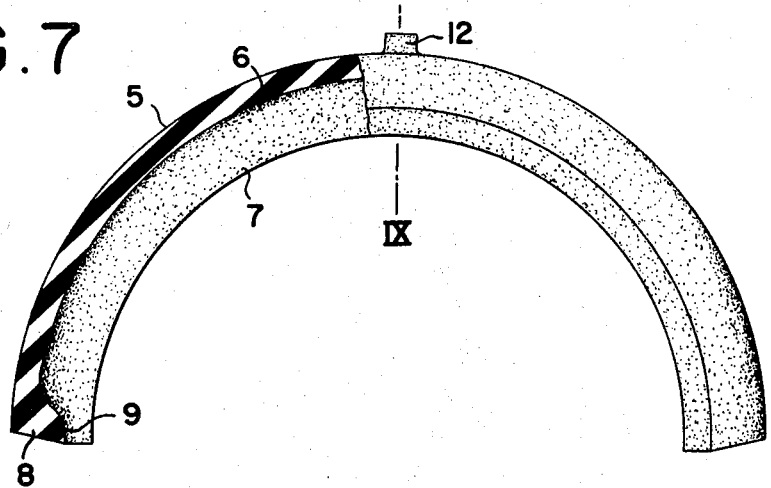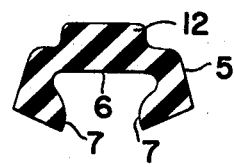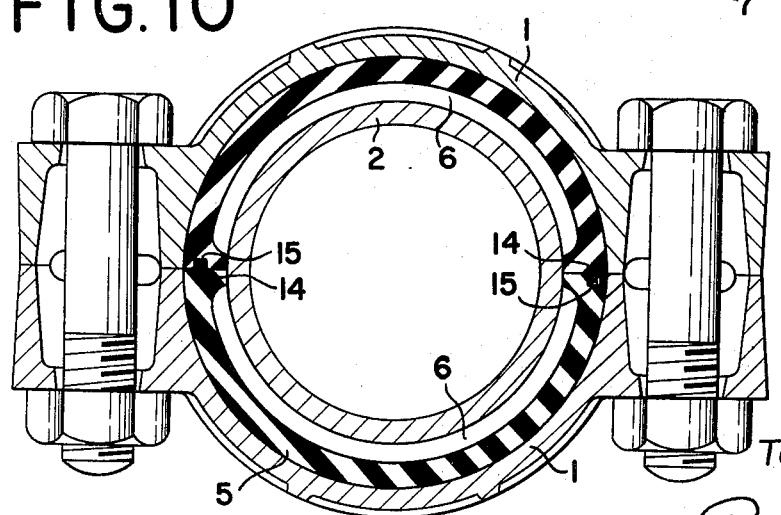

United States Patent Office 3,664,691
Patented May 23, 1972

3,664,691
PIPE JOINTS
Tomomi Nakamura, 11–17, 3-chome, Nishi-Ikebukuro,
Toshima-ku, Tokyo, Japan
Filed May 15, 1970, Ser. No. 37,784
Int. Cl. F16l 17/04
U.S. Cl. 285—112                                     1 Claim

ABSTRACT OF THE DISCLOSURE

A pipe joint is provided which is easy for attachment or detachment and replacement in repair and effective for tight sealing. Splitted packing is provided in splitted housing and fastened over opposite ends of two pipes. Tongues are provided on the packing to compress the pipes. On the splitted end surfaces of the packing are provided inclined surface and inside the splitted end surfaces are formed also tongues to compress with each other. These tongues form an annular tongue portion enveloping the inlet of an inner hollow chamber of the packing.

---

This invention relates to pipe joints, and more particularly to pipe joints which are easy to attach and detach and repair and adapted to obtain improved sealing for pipings.

It is generally known that two pipes are jointed with end of one pipe abutted to end of other pipe in opposite, said ends of pipes being covered with a packing, which is enveloped with two- or three-fold splitted housings and these housings are clamped with fastening bolts securely to form a complete pipe joint. The conventional type of of the pipe joint as described above involves considerable problems.

According to such type, the used packing is formed in a complete ring form. So as to provide a packing for surrounding both pipe end in opposite, it is required to initially dispose the two pipes at appreciable interval, one of which pipes being attached with a side portion of packing and other pipe being shifted in the axial direction adjacent to the other pipe fitted to other side of the packing. For shifting the end of one pipe adjacent to other in the axial direction, however, the operation is quite laborious for large diameter pipes, although appreciably easy for small diameter ones. Cranes and other mechanical assistances are oftentimes necessary for the operation. In particular, accurate centering of the two pipes for jointing affords another great difficulty for the insertion of pipes into packing. The packing either for large or small diameter pipe is not disposed to be readily extracted from between connecting ends of the pipe fixedly attached thereto. For the removal or replacement of the packing as for example for repair, it is necessitated to disassemble the pipe line including the pipe part to be removed as well as its surrounding part in a wide range bending the pipe line or cutting off the portion thereof. It is then required to replace the cut-off portion with new one so that necessarily the operation becomes extremely troublesome and complicated equipments.

It is the general object of the invention to provide a pipe joint which overcomes the above disadvantages, can readily remove the packing without moving the pipes that have once been jointed in opposite positions, easily repair and obtain a good sealing condition.

According to an object of the invention, there is provided a pipe joint of the type described in which splitted packings in two or more fold splitted housings are disposed to compress against opposite sides of two pipes, which packing having tongues to be covered on and between opposite ends of pipes to be connected and having inclined splitted surfaces, on which tongues being provided inside said splitted end surface portions, said tongues forming annular portions surrounding an inlet passing to the inner hollow camber.

According to other object of the invention, the pipe joint is of a construction so designed that a fitting projection is formed at the top of said splitted packing and the housing is provided with a recessed portion corresponding to the projection such that said packing and said housing will have a fixed and precise attachment to each other.

According to other object of the invention, the pipe joint is provided with a fitting groove and a fitting projection to compensate for each other on the splitted end surfaces in abutment of said splited packing so that leaking can be effectively prevented.

According to still other object of the invention, the pipe joint has a splitted packing which is in normal condition formed in an elevation at the top with compressive surface of the tongue being horizontal and in operation condition is compressed in flat so as to impart the compressed surface of the tongue a tendency of inclination to facilitate the insertion of packing.

These and other objects and features of the invention will be apparent from the description on the embodiments shown by way of example with reference to the accompanying drawings.

In the drawings,

FIGS. 7, 8 and 9 are views corresponding to FIGS. 3, 4 and 5 of the packing used in the second embodiment as abovementioned;

FIG. 10 is a view corresponding to FIG. 1 of the third embodiment of the pipe joint according to the invention;

Figure 3:
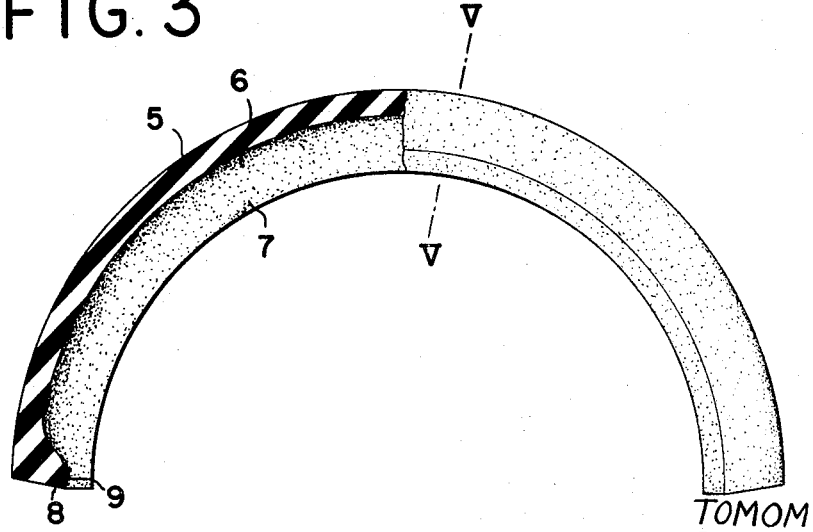
FIG. 3 is a partly sectional front view of a packing used in the first embodiment.
Figure 4:
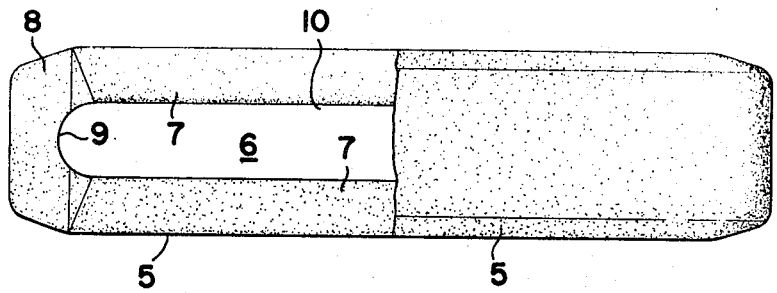
FIG. 4 is a partly plane and lower surface of the embodiment of FIG. 3.
Figure 5:
FIG. 5 is a cross section taken along the line V—V of FIG. 3.
Figure 6:
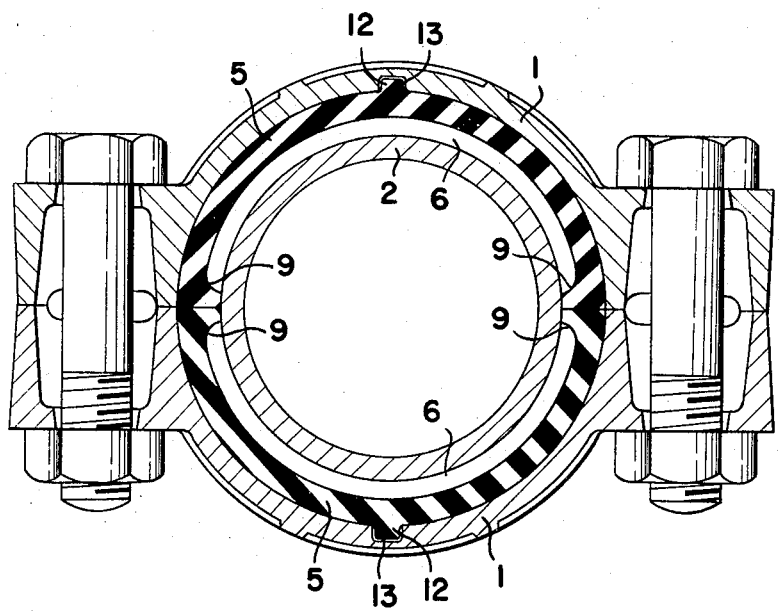
FIG. 6 is a view corresponding to FIG. 1 of the second embodiment of the pipe joint according to the invention.
Figure 11:
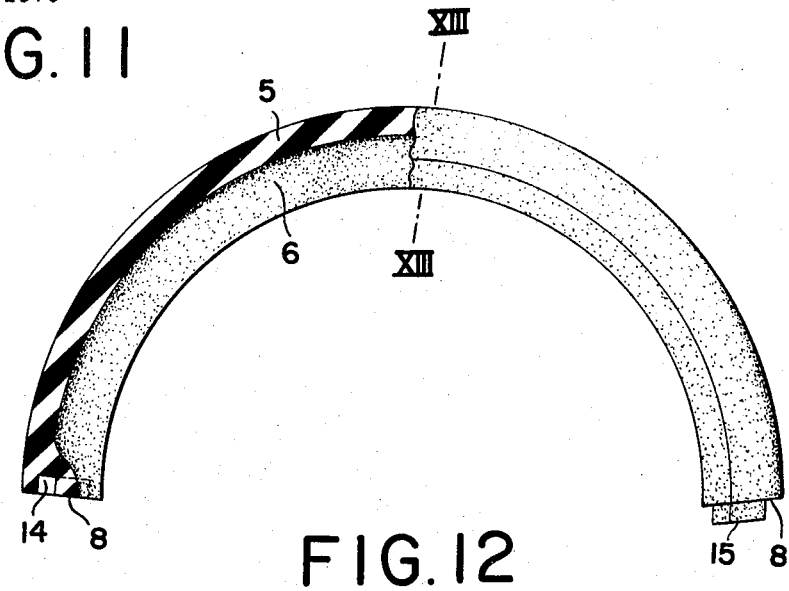
FIGS. 11, 12 and 13 are views corresponding to FIGS. 3, 4 and 5 of the packing used in the third embodiment as mentioned above.
Figure 12:
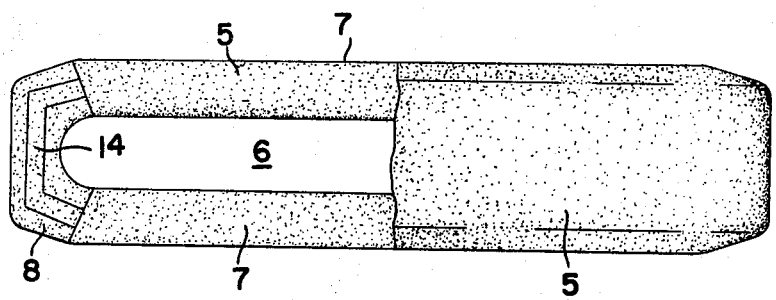

Referring now to drawings, twofold splitted housings 1, 1 are covered on and between opposite end portions of the pipes 2, 2 to be connected. They are same as in conventional in the insertion of a fastening bolts 3, 3 for fastening seats 4, 4 of said housings 1, 1. In said housings 1, 1, there are provided packings 5, 5 splitted in the radial direction of the pipe 2. These splitted packings 5, 5 have hollow chambers 6, 6 formed in the interior and have tongues 7, 7 on both sides having inclination to compress the pipe periphery under normal condition as shown in FIG. 5. Its splitted end surfaces 8, 8 have adequate inclined surfaces as shown in FIG. 3. Similar compressive tongues 9, 9 are formed also inside the splitted surface portions 8, 8. The described tongues 7, 7 and said compressive tongues 9, 9 are serially connected to form an angular tongue enveloping the inlet 10 passing to the described hollow chamber 6.

Splitting of the housing and the packing are made generally twofold as shown in the accompanying drawings. To facilitate the practical treatment of large pipes the housing and the packing may preferably be splitted twofold or more. In any case, however, the splitting of the housing and the packing may be in conformity with each other in number.

Figure 1:
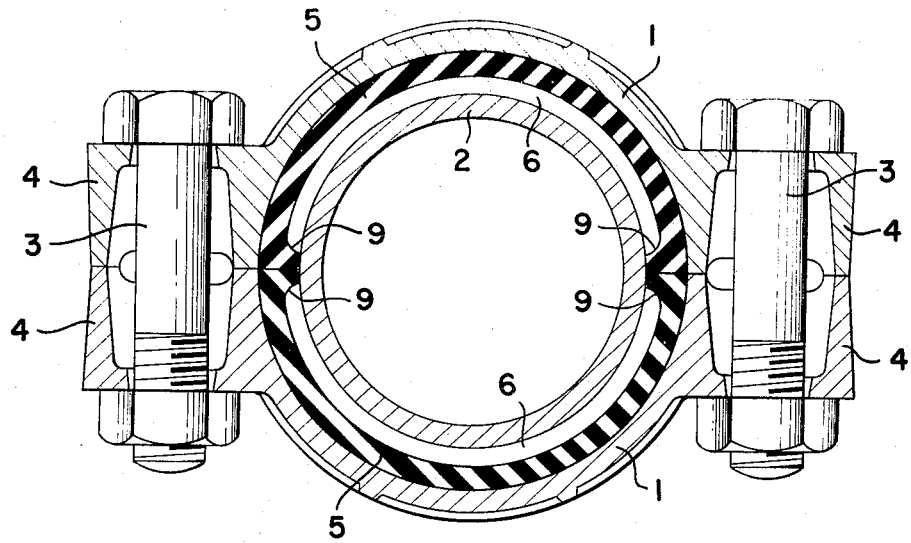
FIG. 1 is a vertical section in the direction of a pipe axis of a first embodiment showing a pipe joint according to the present invention.
Figure 2:
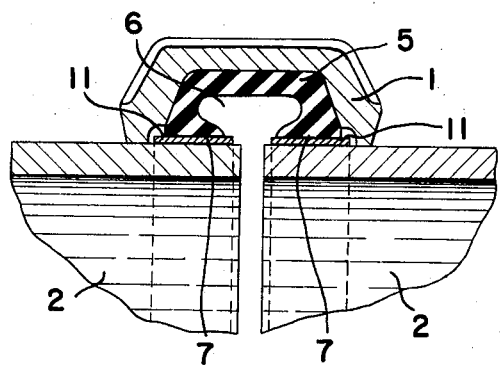
FIG. 2 is a partly cutaway section of the pipe axis in horizontal direction thereof.

According to the invention, the packing 5 is of the splitting type in which the splitted packing pieces may be attached to or detached from the outside of the connection part. Although the packing cannot exert a compression force against the pipe as in the conventional method, the compression of the housing covered on the packing of the invention will urge the tongues 7, 7 of packing to compress against the outer periphery of the pipe and contact the compressive tongues 9, 9 with inclinations in linear manner as shown in FIG. 1, producing a close connection with initial compressive force as desired. When the fluid pressure in the pipe 2 is applied in the hollow chamber 6, said fluid permits the tongues 7 and 9 to contact in the same pressure, whereby the above adhering contact can be effectively maintained in proportion to the internal pressure so that an adequate connection can be effected without leakage. The numeral 11 denotes a stop ring fixed to the outside of the end of the pipe 2 in order to hold the housing on the pipe and to provide the seat for the tongue 7 of the packing 5.

Thus the packing 5 according to the invention can be splitted so as to simplify the attachment and detachment to and from the pipes to be connected. A desired contact relation can be established between the pipe and the packing as well as between the splitted packings by compressively covering the housings 1, 1. The adhering contact can be varied proportionally to the variation of internal pressure to always maintain a better leakage prevention. In practice, the housing and the packing are not tended to separate completely as seen in the prior art but these elements can be integrally controlled.

In FIGS. 6 to 9, a second embodiment of the invention is shown.

Reverting to the first embodiment, the housing and the packing are splitted into two or three portions at the sectitonal surface, in which the splitted packing pieces will not have connection to the housing such that the relative position between the pipe and packing and between the packing and housing cannot be ensured, particularly, as the packing is covered in the housing precise arrangement is not possible for the packing. Therefore the packing cannot secure sufficient sealing.

The second embodiment has removed the drawback of the first embodiment. Thhe first embodiment is similar in construction to that of the second embodiment, although it differs in that in the second embodiment a projection 12 is provided at the back surface of these splitted packings 5, 5, and said projection 12 is fitted in the recess 13 provided in the inner surface of the housing 1. Similar tongues 7, 7 and 9, 9 are provided on both sides of the packing and inside the splitted end surface portion. The tongues 7, 7 and the compressive tongues 9, 9 are connected so as to form an annular tongue surrounding the inlet 10 passing to the hollow chamber 6 as described, similar to the first embodiment.

In the described embodiment, the splitted packings 5, 5 are connected to the housing 1, 1 at the projection parts 12 so that the atachment of the packing 5 and the housing 1 is constant to provide an exact relationship of attachment. In particular, as the packing 5 is simply integrated with the housing 1 no special care is to be considered for the attachment and treatment of the packing. The packings 5, 5 can be automatically attached precisely merely by covering and fastening the housings 1, 1.

A third embodiment is shown in FIGS. 10 to 13. Similar to the second embodiment, the third embodiment provides that a packing is splitted into two and the splitted packing in combination makes it impossible to have a stable and exact relation. Thus respective splitted packings cannot ensure a precise relation with the housing and therefore hinders the accurate packing arrangement, in consequence, insufficient sealing relation.

The described embodiment is an improvement in which the abovementioned drawback has been eliminated. As shown in the drawings, splitted end surfaces 8, 8 of the above embodiment are formed with inclined surfaces as in FIGS. 11 and 12. On the end surfaces 8, 8 of these splitted packings 5, 5 are provided a groove 14 and a projection 15 to fit to the groove 14 on another packing, these groove 14 and projection 15 being combined and fitted with each other.

Figure 14:
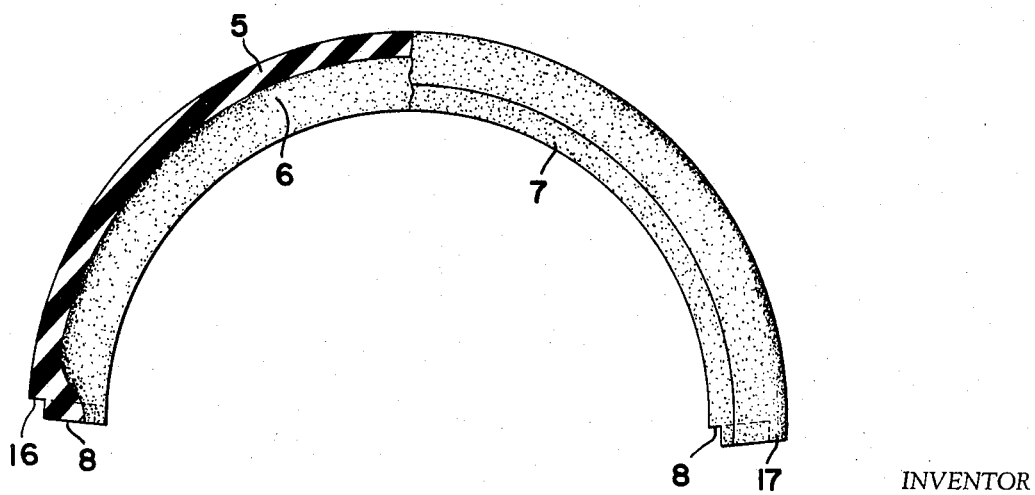
FIGS. 14 and 15 are views corresponding to FIGS. 11 and 12 of the packing appreciably modified of the packing used in the above third embodiment.
Figure 13:
Figure 15:
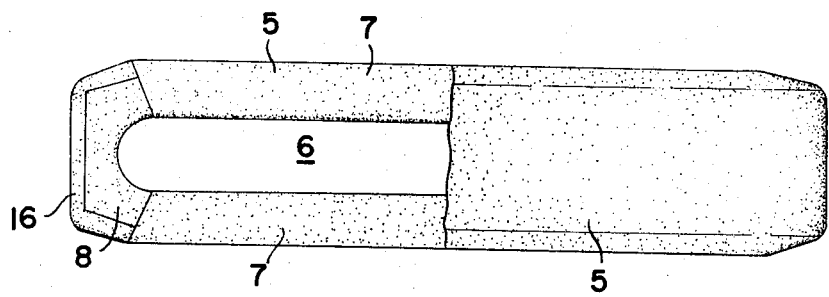

Another modified embodiment of the packing is shown in FIGS. 14 and 15. In the embodiment shown in FIGS. 10 to 13, the groove 14 and the projection 15 are formed in the middle of the end surfaces 8, 8, whereas the embodiment of FIGS. 14 and 15 provides that the groove 16 and projection 17 are formed at the outer side of the splitted end surfaces 8, 8. These groove 16 and projection 17 are fitted with each other. Although not shown in particular, it is apparent that these groove 16 and projection 17 may be provided inside the splitted end surfaces 8, 8 or at a position along the hollow chamber 6.

According to the embodiment as described, the packing which consists of splitted packing pieces 5, 5 may be enough to be attached to a connection part from outside. This construction effectively overcomes the drawback of the conventional ring-shaped packing facilitating the attachment and detachment of said packing in large diameter pipes and in the joint of a fixed pipe line. The thus splitted packings 5, 5 can engage the groove 16 and the projection 17 so that the engagement of such packings 5, 5 at the splitted end surfaces can be accurately defined for forming an exact connection similar to the integrated ring-shaped packing. Therein the attachment relation of the packings 5, 5 and the housing 1 can be maintained always constant and the sealing relation between the splitted end surfaces 8, 8 may be well retained to be effective for the correct prevention of leaking.

Figure 16:
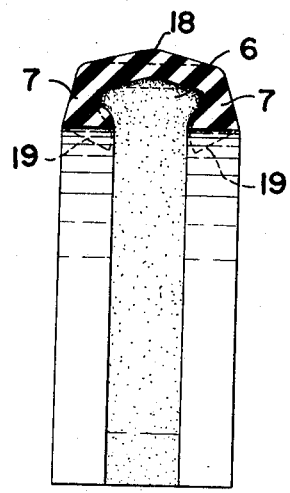
FIG. 16 is a cross section of the packing used in the fourth embodiment of the pipe joint according to the invention. Throughout the embodiments, identical parts are denoted by identical reference numerals.

In the fourth embodiment of FIG. 16, the cross section of the packing is appreciably different from those of abovementioned embodiments. According to the embodiment, the splitted packings 5, 5 are formed a hollow chamber 6 each in the interior thereof. On the back surface of the hollow chamber 6 is formed an expanded portion 18 projecting to the back surface under normal condition as shown with a solid line in FIG. 16. Compression surfaces 19, 19 provided on both sides of the hollow chamber 6 are normally linear in shape.

The splitted end surfaces are formed in an appreciably inclined surface similar to the abovementioned embodiments. In order to attach the packing to the connection part of pipes, it suffices that the splitted packing pieces may be attached from outside to the connection part so that attachment and detachment of the packing to the large diameter pipe and to the joint in the fixed pipe line can be greatly facilitated. Particularly, the compressive surfaces 19, 19 are located almost on a line so that the packing can be attached in utmost stability. The packings 5, 5 thus located on the pipes 2, 2 is covered by the housings 1, 1 having a linear inner surfaces and fastened as in the abovementioned embodiments. By covering and fastening, the expansion part 18 on the back surface of the packing 5 is compressed by the inner surface of housing 1 assuming a flat form as shown by phantom lines in FIG. 16, whereby the tongues 7, 7 on both sides is pushed out to the pipe side as shown by phantom lines in FIG. 16.

The tongues 7, 7 of the packing by compressive force of the pipe by deformation of the packing 5 is tightly compressed against the outer periphery of the pipe 2 effecting a good sealing. The compressive deformation against the expansion part 18 on the back surface of the packing acts to increase the inclination of the splitted end surface of the packing 5. Even though it is small the inclination will cause effective connection or sealing between said splitted end surfaces.

According to this embodiment, the packing 5 is splitted up and the compressed surfaces 19, 19 of the tongues 7, 7 are located on almost a line. Thus the attachment and detachment of the packing to be connected is made extremely simple. The difficulty of such operation as in the conventional method can be fully eliminated. Especially, location of the packing on the pipe is much stabilized. By compressing and covering the packing with housings 1, 1, the expansion part 18 on the back surface of the packing 5 is biased to deform the packing, imparting a desired contact and sealing between the pipe and packing and between the packings. Such contact and sealing would vary with the change of the internal pressure so as to effect a good leakage prevention at all times.

What I claim is:

1. A pipe coupling assembly for two axially aligned pipes having adjoining end portions of equal diameter, comprising at least two arcuate packing members each having an inner central channel defining a pair of opposing axial tongues for overlaying and pressing against the adjoining end portions of the pipes, opposite ends of each packing member being slanted away from adjacent opposite ends of an adjoining packing member in an uncompressed condition, so that the juxtaposed ends of the packing membesr abut each other to form tight radial seals when under compression, opposite ends of each packing member being further formed with a projection and recess respectively for mutually engaging with a recess and projection of an adjoining packing member, each recess and projection being shorter radially of the packing member than the radial thickness of the packing member to insure tight radial seals when the projections and recesses are interfitted and abutted ends of the packing members are under compression; at least two arcuate rigid housings for enclosing the packing members respectively and holding them in compression around the end portions of the pipes; and quick detachable bolt and nut assemblies at abutted ends of the housings holding the housings in place around the packing members.

References Cited

UNITED STATES PATENTS

| | | | |
|---|---|---|---|
| 2,463,235 | 3/1949 | Andrews | 285—373 X |
| 3,479,066 | 11/1969 | Gittleman | 285—373 X |
| 2,218,835 | 10/1940 | Ulrich | 277—206 X |
| 2,437,246 | 3/1948 | Drinkwater | 285—373 X |

FOREIGN PATENTS

| | | | |
|---|---|---|---|
| 790,109 | 2/1958 | Great Britain | 285—373 |
| 585,534 | 2/1947 | Great Britain | 285—373 |
| 1,035,422 | 7/1958 | Germany | 285—373 |

DAVE W. AROLA, Primary Examiner

U.S. Cl. X.R.

277—206, 199; 285—373, DIG 11